United States Patent
Benco et al.

(10) Patent No.: US 7,801,507 B2
(45) Date of Patent: Sep. 21, 2010

(54) INCREASED AUTOMOBILE SECURITY VIA USE OF WIRELESS NETWORK

(75) Inventors: David S. Benco, Winfield, IL (US);
Kevin J. Overend, Elmhurst, IL (US);
Baoling S. Sheen, Naperville, IL (US);
Sandra L. True, St. Charles, IL (US);
Kenneth J. Voight, Sugar Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 844 days.

(21) Appl. No.: 11/636,825

(22) Filed: Dec. 8, 2006

(65) Prior Publication Data

US 2008/0136611 A1    Jun. 12, 2008

(51) Int. Cl.
*H04M 1/66* (2006.01)
*H04M 3/42* (2006.01)
*B60R 25/10* (2006.01)
*G06F 15/16* (2006.01)

(52) U.S. Cl. ............... 455/410; 455/414; 340/426.3; 709/231

(58) Field of Classification Search ........... 455/410, 455/414; 340/426.1, 426.3, 426.36, 426.16, 340/426.2
See application file for complete search history.

(56) References Cited

U.S. PATENT DOCUMENTS

| | | | | |
|---|---|---|---|---|
| 6,148,212 | A * | 11/2000 | Park et al. | 455/456.1 |
| 7,444,133 | B1 * | 10/2008 | McNamara et al. | 455/411 |
| 7,483,772 | B2 * | 1/2009 | Oesterling et al. | 701/2 |
| 2002/0135466 | A1 * | 9/2002 | Bunyan | 340/426 |
| 2004/0185842 | A1 * | 9/2004 | Spaur et al. | 455/420 |

* cited by examiner

*Primary Examiner*—Lester Kincaid
*Assistant Examiner*—Kuo Woo
(74) *Attorney, Agent, or Firm*—Carmen Patti Law Group, LLC

(57) ABSTRACT

A method and apparatus are provided to assist in providing security for vehicles with keyless ignition systems. The present invention involves receiving, via wireless communications, a signal to start an ignition of the vehicle. Upon receipt of the signal, a built-in cellular phone in the vehicle transmits a message to a server to provide a security key to the vehicle and the security key and a message to all mobile phones registered to a driver of the vehicle. The message indicates that an attempt has been made to start the vehicle. Upon receipt of the security key, the driver of the vehicle may input the security key into a key pad of the vehicle. If the security key received by the vehicle from the server matches the security key inputted by the driver of the vehicle, then the keyless ignition system may start the vehicle.

24 Claims, 5 Drawing Sheets

INCREASED AUTOMOBILE SECURITY VIA USE OF WIRELESS NETWORK

TECHNICAL FIELD

This invention relates to the art of wireless telephony, and more particularly to a method of providing security for automobiles via wireless communications.

BACKGROUND

Today, many automobiles are sold with remote keyless ignition systems. Remote keyless ignition systems allow individuals to start an ignition of an automobile from a short distance away from the automobile, eliminating the need to physically manipulate a key into an ignition of the automobile. Some automobiles with remote keyless ignition systems can be started by the push of a button on a small, hand-held fob, i.e., a small transmitter, attached to the driver's key ring. Other automobiles have a proximity system that is triggered if a key-like transducer is within a certain distance of the automobile.

A remote keyless ignition system uses a coded Radio Frequency Identification (RFID) chip. The remote keyless ignition system operates based on a radio frequency signal being emitted from the automobile and received by a fob. The fob would then send a response to the automobile, and the automobile would be started. Disadvantageously, an unauthorized person with the appropriate electronic equipment may be able to eavesdrop on the radio frequency transmissions between the automobile and the fob and learn the security codes utilized to operate the vehicle. Upon obtaining the security codes, the automobile may be stolen within seconds. Also disadvantageously, the owner of the automobile may not know that the automobile has been stolen until some time afterwards.

SUMMARY

It has been recognized, in accordance with the principles of the invention, that the problems of the prior art can be overcome by a technique that uses wireless networks to provide an additional layer of security for vehicles with remote keyless ignition systems. More specifically, the present invention provides an apparatus and method to assist individuals in providing security for a vehicle activated by a keyless ignition system by a) receiving, via wireless communications, a signal to start an ignition of the vehicle, b) transmitting, upon receipt of the signal, a message to a server to provide a security key to the vehicle and to one or more mobile phones registered to a driver of the vehicle, and c) starting the ignition when, upon receipt of the security key by the driver and the vehicle, the security key received by the driver and inputted to the vehicle is identical to the security key received by the vehicle.

DETAILED DESCRIPTION

Figure 1:
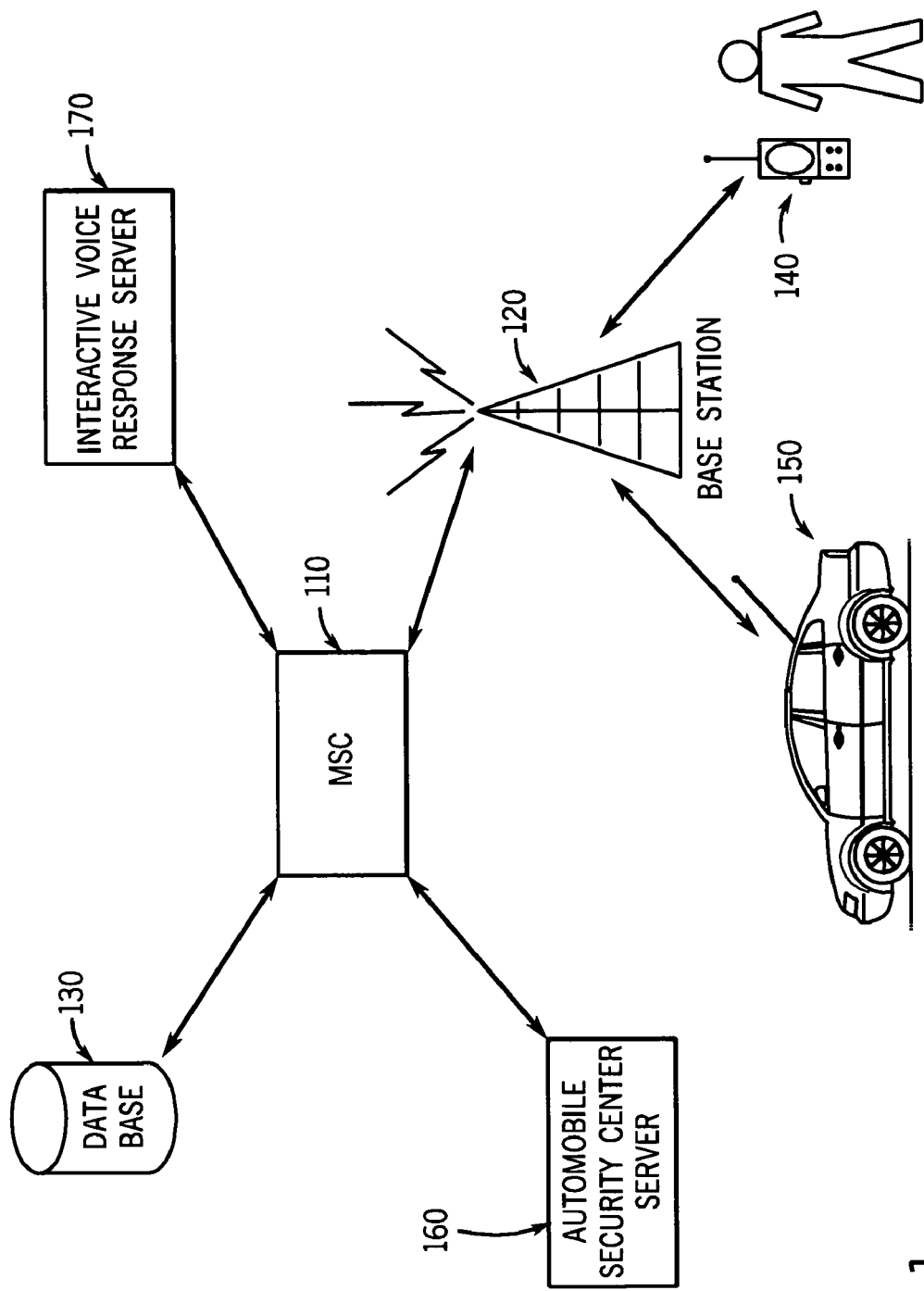
FIG. 1 shows an illustrative view of a network diagram arranged in accordance with the principles of the invention.

FIG. 1 shows an illustrative view of a network diagram arranged in accordance with the principles of the invention. As shown in FIG. 1, communications network 100 includes MSC 110 which is connected to base station 120. Also, MSC 110 is connected to data base 130 and interactive voice response server 170. MSC 110 is the last registered MSC for a) mobile phone 140, which is operated by an owner or driver of automobile 150 and b) a built-in cellular phone system, not shown, of automobile 150. Furthermore, MSC 110 is connected to Automobile Security Center Server 160.

MSC 110 is a telecommunications switch capable of switching calls between a plurality of endpoints via a wireless network connected to the public switched telephone network (PSTN), not shown. MSC 110 has call control components, not shown, that monitor all mobile phone calls, e.g., calls from mobile phone 140, within its serving area, tracks the location of all mobile phone-equipped vehicles, e.g., automobile 150, traveling within its service area, arranges handoffs between switches, keeps track of billing information, etc. MSC 110, in one embodiment, comprises one or more of a 5ESS® 2000—Switch Mobile Switching Center (MSC) (Lucent Technologies).

MSC 110 is connected to a data base, e.g., data base 130, which stores and manages subscriber records of all mobile phones registered to MSC 110. The records may include the names, telephone numbers, address and telephone features subscribed to, etc., of all mobile phone subscribers registered to MSC 110. The records may be organized so that when information identifying a subscriber, is presented, the corresponding subscriber name, address and all other telephone numbers of the subscriber may be retrieved. Thus, illustratively, database 130 may store a mobile phone number for the owner or driver of automobile 150, and the stored mobile phone number may be retrieved in response to presentation of an identifier of the owner or driver of automobile 150. Data base 130 may be stored local to MSC 110, or remote therefrom.

In an alternative embodiment of the invention, data base 130 may be connected to Automobile Security Center Server 160 rather than MSC 110. In this embodiment, Automobile Security Center Server 160, which may be operated by a vehicle monitoring and tracking service provider, utilizes data base 130 to determine which mobile phone numbers to use when contacting customers.

Base station 120 is a radio transmitter/receiver that provides wireless connectivity to wireless communication devices, e.g., mobile phone 140, within a geographical area, or a cell, i.e., a basic geographic unit of a cellular system, proximate to base station 120. Base station 120 may use an air interface standard that is complementary to the air interface standard of mobile phone 140 so that calls may be connected from mobile phone 140 to a mobile switching center, e.g., MSC 110, which may connect the calls to the PSTN, not shown. Base station 120, in one embodiment, comprises one or more of a Flexent® Code Division Multiple Access (CDMA) 450 MHz Modular Base Station (Lucent Technologies).

Interactive voice response server 170 provides interactive voice messages and announcements to mobile phone users, e.g., the user of mobile phone 140, after MSC 110 has contacted the mobile phone users to deliver a message. Interactive voice response server 170, in one embodiment, comprises one or more of an Enhanced Media Resource Server (eMRS) (Lucent Technologies).

Mobile phone 140 is a mobile communications device capable of wirelessly connecting to communications network 100 via a telephone switching network having wireless technologies that may include one or more base stations, e.g., base station 120, connected to one or more mobile switches, e.g., MSC 110, allowing a user of mobile phone 140 to communicate, via a user interface on mobile phone 140, with a caller, not shown. The user interface of mobile phone 140 may include an audio interface, such as a microphone and speakers, a visual interface, such as a display, and a user input interface, such as a keyboard or touch pad.

Mobile phone 140 may be operated in a given geographical area which may be a visiting area by which a subscriber roams into or the subscriber's home service area. Mobile phone 140 is capable of sending and receiving voice calls, email, short message service (SMS), microbrowser messages or text messaging. Mobile phone 140 may use an air interface standard such as Code Division Multiple Access (CDMA), Time Division Multiple Access (TDMA), Universal Mobile Telecommunications System (UMTS), Global System for Mobile Communications (GSM), etc., not shown, or any other standard or protocol which supports voice calls, email, SMS, microbrowser messages or text messaging. Mobile phone 140 may be capable of multi-band operation, i.e., two radio access technologies.

In one embodiment of the invention, mobile phone 140 may be a small, light-weight portable mobile telephone, e.g., pocket telephone. In an alternative embodiment of the invention, mobile phone 140 may be a personal digital assistance (PDA) device, a two-way pager, a notebook computer, or other suitable mobile communications devices.

Automobile 150 is a commercially available self-propelled vehicle capable of transporting people and objects between a starting point and an end point. Automobile 150 has seats, not shown, upon which people or objects rest in sitting, a steering column, not shown, for controlling the direction of transport of automobile 150, doors for entering and leaving automobile 150, an engine, not shown, that provides power for automobile 150 to transport people and objects between the starting point and the end point, an ignition system, not shown, which activates automobile 150, wheels that turn around an axle, not shown, for moving automobile 150 between the starting point and the end point, a trunk for storing objects, and a fuel compartment for storing fuel needed to operate automobile 150.

Automobile 150 may be activated remotely via a remote keyless ignition system. The ignition system of automobile 150 may be modified to delay the activation of automobile 150 by the remote keyless ignition system until a security key has been received and verified by the remote keyless ignition system.

Automobile 150 may have a built-in cellular phone system, not shown, supplied with current from an electrical system of automobile 150. The built-in cellular phone system connects to communications network 100 via base station 120. The built-in cellular phone system may connect to the remote keyless ignition system to allow the built-in cellular phone system to a) automatically call a server to request a security key when an attempt has been made to start automobile 150 and b) forward a received security key to the remote keyless ignition system. The built-in cellular phone system may be a component of a subscription-based communications, monitoring, and tracking service, such as OnStar provided by General Motors Corporation.

Initially, in the present invention, the owner and other drivers of automobile 150 must register their mobile phone numbers with Automobile Security Center Server 160 so that the owner or driver of automobile 150 may be contacted each time there is an attempt to start automobile 150. The mobile phone numbers may be stored in database 130.

When the driver or owner of automobile 150 employs the fob of the remote key ignition system of automobile 150 to start automobile 150, the activation of the ignition system may be delayed until a security key has been received and verified. Upon receipt of a signal from the fob by automobile 150, the built-in cellular phone system of automobile 150 will automatically call Automobile Security Center Server 160 and transmit a message, e.g., a Session Initiation Protocol (SIP) message, to Automobile Security Center Server 160 to request the security key. The message may contain an identifier of the driver of automobile 150 or an identifier of automobile 150 itself, such as i) a license plate number; ii) a vehicle identification number (VIN); iii) a telephone number of the built-in cellular phone system; iv) a bar code; v) the year, make and model type of automobile 150; or other information identifying automobile 150.

Upon receipt of the message from the built-in cellular phone system of automobile 150, Automobile Security Center Server 160 determines and generates the security key. Automobile Security Center Server 160 transmits a message with the security key and the identifier to MSC 110 instructing MSC 110 to a) forward the security key to automobile 150 and b) forward the security key and a message to one or more mobile phones of the driver or owner of automobile 150. Automobile Security Center server 160 may transmit the message with the security key and the identifier via a SMS message.

Upon receiving the message from Automobile Security Center Server 160, MSC 110 does a translation of the identifier via data base 130 to determine which telephone numbers should receive the security key. Upon obtaining the translation, MSC 110 transmits a message with the security key to the built-in cellular phone system of automobile 150, which forwards the security key to the remote keyless ignition system of automobile 150. MSC 110 may include a special "key" or character in the message to the built-in cellular phone system that allows the built-in cellular phone system to recognize that a) the security key is contained in the message and b) the security key must be forwarded to the remote keyless ignition system. Also, MSC 110 provides the security key and a message to one or more mobile phones, e.g., mobile phone 140, registered to the driver or owner of automobile 150 via a phone call, a text message or a SMS message. Illustratively, in providing the phone call, MSC 110 may utilize interactive voice response server 170 to announce via an automated voice that "An attempt has been made to start automobile 150 and the security key is 123".

Upon obtaining the security key, the driver or owner of automobile 150 may enter the security key into a keypad, not shown. The keypad may be located within automobile 150 or on the exterior of automobile 150, e.g., near the door handle. The keypad may be used to provide data to a processor, not shown, which may be a component of the remote keyless ignition system of automobile 150. The processor performs a matching process to compare the security key received by automobile 150 to the security key inputted by the driver or owner of automobile 150 to determine whether the security keys match. If the security key entered by the driver or owner of automobile 150 is identical to the security key transmitted to automobile 150, then the ignition of automobile 150 may start. If at least one difference exists between the security key received by automobile 150 and the security key inputted by the driver or owner of automobile 150, then an error alert, e.g., an alarm, may be produced. The error alert may be audible or visual. The driver or owner of automobile 150 may be allowed to retry the operation a predetermined number of times, e.g., 2 times, by having a new security key sent by Automobile Security Center Server 160.

In another embodiment of the invention, upon obtaining the security key transmitted from Automobile Security Center server 160, the driver or owner of automobile 150 may employ Automobile Security Center Server 160 to start the ignition of automobile 150. In this embodiment, the driver or owner of automobile 150 enters the received security key into mobile phone 140, and transmits the security key as a SMS message to Automobile Security Center Server 160. In response, Automobile Security Center Server 160 transmits a second SMS message to automobile 150, which starts the ignition of automobile 150.

Figure 2:
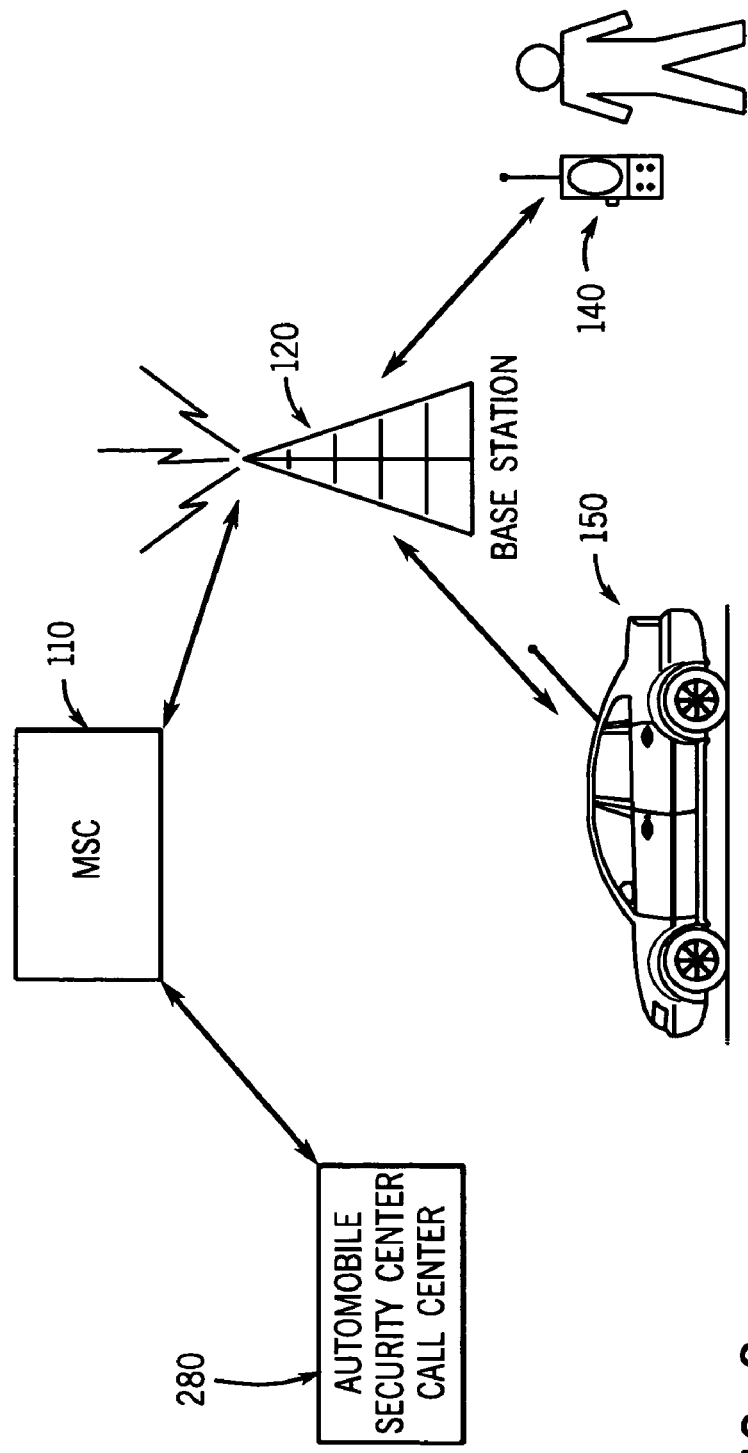
FIG. 2 shows another illustrative view of a network diagram arranged in accordance with the principles of the invention.

FIG. 2 shows yet another embodiment of the invention. In FIG. 2, MSC 110 is connected to base station 120 and Automobile Security Center Call Center 280. MSC 110 is the last registered MSC for a) mobile phone 140, which is operated by an owner or driver of automobile 150 and b) a built-in cellular phone system, not shown, of automobile 150. In this embodiment, the driver or owner of automobile 150 may utilize mobile phone 140 or any available mobile phone or a wire-line telephone, not shown, to call Automobile Security Center Call Center 280. This manual arrangement may be beneficial to the driver in instances when mobile phone 140 is unavailable, e.g., low battery condition, damaged or lost telephone, etc. An employee of Automobile Security Center Call Center 280 may ask the driver or owner of automobile 150 a series of questions to determine the identity of the driver or owner of automobile 150. Illustratively, the employee of Automobile Security Center Call Center 280 may ask for a) the maiden name of the mother of the driver or owner of automobile 150 or b) a pre-arranged security password known only by the driver or owner of automobile 150. Upon establishing the identity, the employee of Automobile Security Center Call Center 280 may provide the security key verbally by telephone. Afterwards, the driver or owner of automobile 150 may enter the security key into the keypad within automobile 150 to start automobile 150.

Those of ordinary skill in the art will readily be able to select MSCs, base stations, data bases and interactive voice response servers appropriate for use in any particular implementation of the technique for increased security of automobiles via use of wireless networks.

Advantageously, the present invention offers an additional layer of security for owners of automobiles with remote keyless ignition systems. Also advantageously, the present invention offers the additional security of allowing the registered driver of a vehicle to know whenever an attempt is being made to start their automobile, because a message is sent to the mobile phone of the registered driver whenever an attempt is made to start the automobile. If the driver or owner of the automobile knows that a non-registered individual may be attempting to start the automobile, then the automobile security call center may be alerted by the registered driver that someone is attempting to steal the automobile. The automobile security call center may then alert the police to investigate the situation.

Figure 3:
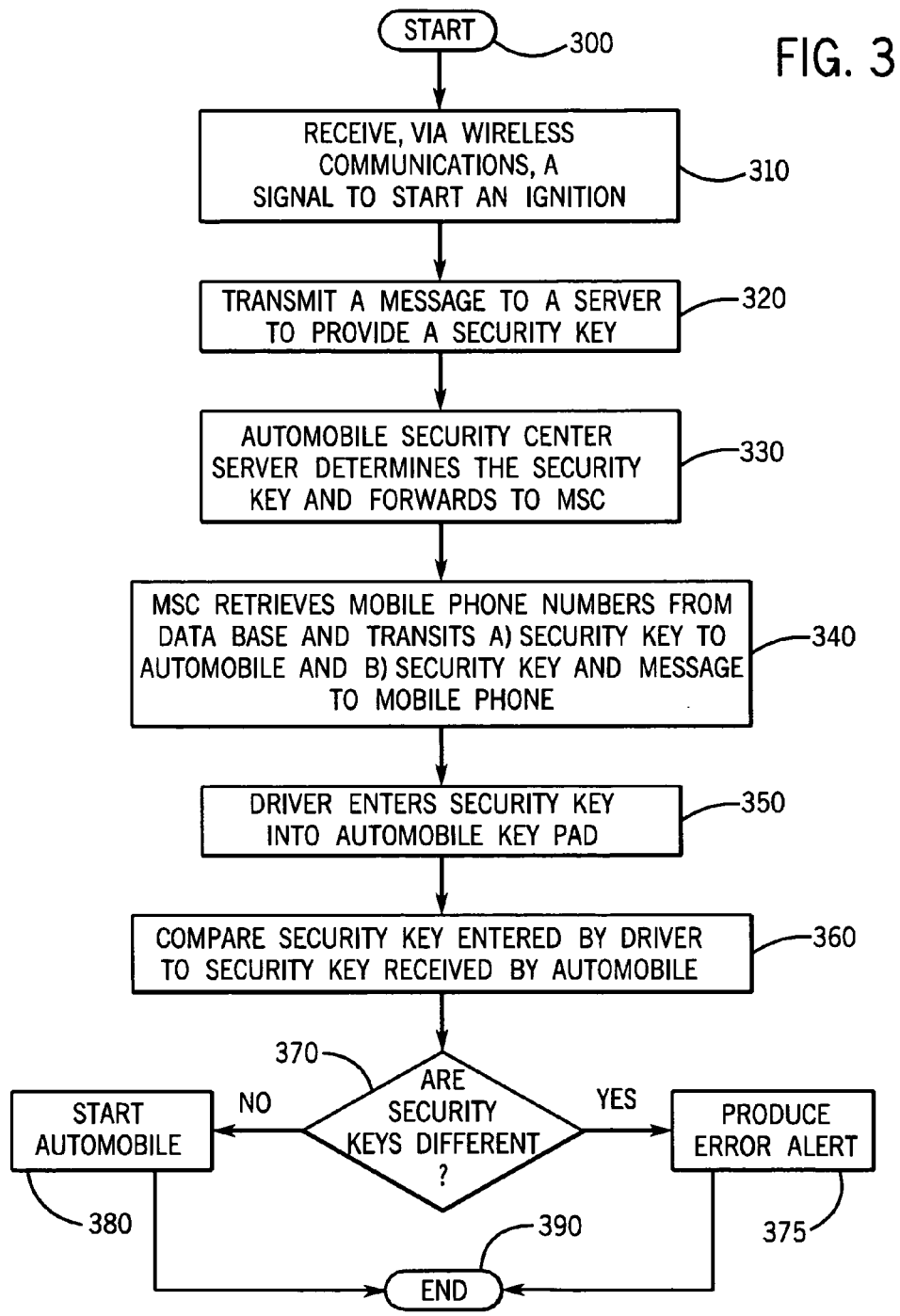
FIG. 3 shows an illustrative flow chart for a method of operating the present invention in accordance with the principles of the invention.

FIG. 3 shows an illustrative flow chart of a method of operating the present invention in accordance with the principles of the present invention. The process is entered in step 300.

In step 310 (FIG. 3), the driver of a vehicle, e.g., automobile 150 (FIG. 1) employs a fob associated with a remote keyless ignition system of the vehicle to start an ignition of the vehicle. Automobile 150 receives, via wireless communications, the signal from the fob when used by the driver of automobile 150. The activation of the ignition system of automobile 150 by the remote keyless ignition system is delayed until a security key has been received and verified.

In step 320 (FIG. 3), upon receipt of the signal, a built-in cellular phone system of automobile 150 (FIG. 1) automatically transmits a message via MSC 110 to a server, e.g., Automobile Security Center Server 160, to provide a security key to automobile 150 and to mobile phones, e.g., mobile phone 140, registered to the driver of automobile 150. The message may contain information identifying a) the driver of automobile 150 or b) automobile 150 itself, such as i) a license plate number; ii) a vehicle identification number (VIN); iii) a telephone number of the built-in cellular phone system; iv) a bar code; v) the year, make and model type of automobile 150; or other identifying information.

In step 330 (FIG. 3), Automobile Security Center Server 160 (FIG. 1) determines the security key and transmits a message with the security key and the identifier to MSC 110 instructing MSC 110 to a) forward the security key to automobile 150 and b) forward the security key and a message to one or more mobile phones of the driver or owner of automobile 150. Automobile Security Center server 160 may transmit the message with the security key and the identifier via a SMS message.

In step 340 (FIG. 3), MSC 110 (FIG. 1) uses the identifier to retrieve from data base 130 the telephone numbers of one or more mobile phones registered to the driver of automobile 150. Upon obtaining the telephone numbers, MSC 110 transmits the security key to automobile 150 via base station 120. Also, MSC 110 provides the security key and a message to one or more mobile phones, e.g., mobile phone 140, registered to the driver of automobile 150 via a phone call, a text message or a SMS message. In providing the phone call, MSC 110 may utilize interactive voice response server 170 to announce via an automated voice that "An attempt has been made to start automobile 150 and the security key is 123".

In step 350 (FIG. 3), upon receiving the security key, the driver of automobile 150 (FIG. 1) enters the security key into a key pad located within automobile 150.

In step 360 (FIG. 3), a processor of the remote keyless ignition system of automobile 150 (FIG. 1) compares the security key received from Automobile Security Center Server 160 to the security key inputted by the driver of automobile 150.

In step 370 (FIG. 3), it is necessary to determine whether there exists at least one difference between the security key received from Automobile Security Center Server 160 (FIG. 1) and the security key inputted by the driver of automobile 150.

If the test result in conditional branch point 370 (FIG. 3) is NO, indicating that the security keys in step 370 are identical, then control is passed to step 380.

In step 380 (FIG. 3), the ignition of automobile 150 (FIG. 1) starts. Then control is passed to step 390.

If the test result in conditional branch point 370 (FIG. 3) is YES, indicating that the security keys in step 370 are different, then control is passed to step 375.

In step 375 (FIG. 3), an error alert is produced. The driver of automobile 150 (FIG. 1) may be allowed to retry the operation a predetermined number of times, e.g., 2 times, by having a new security key sent by Automobile Security Center Server 160. Then control is passed to step 390.

The process is exited in step 390 (FIG. 3).

Figure 4:
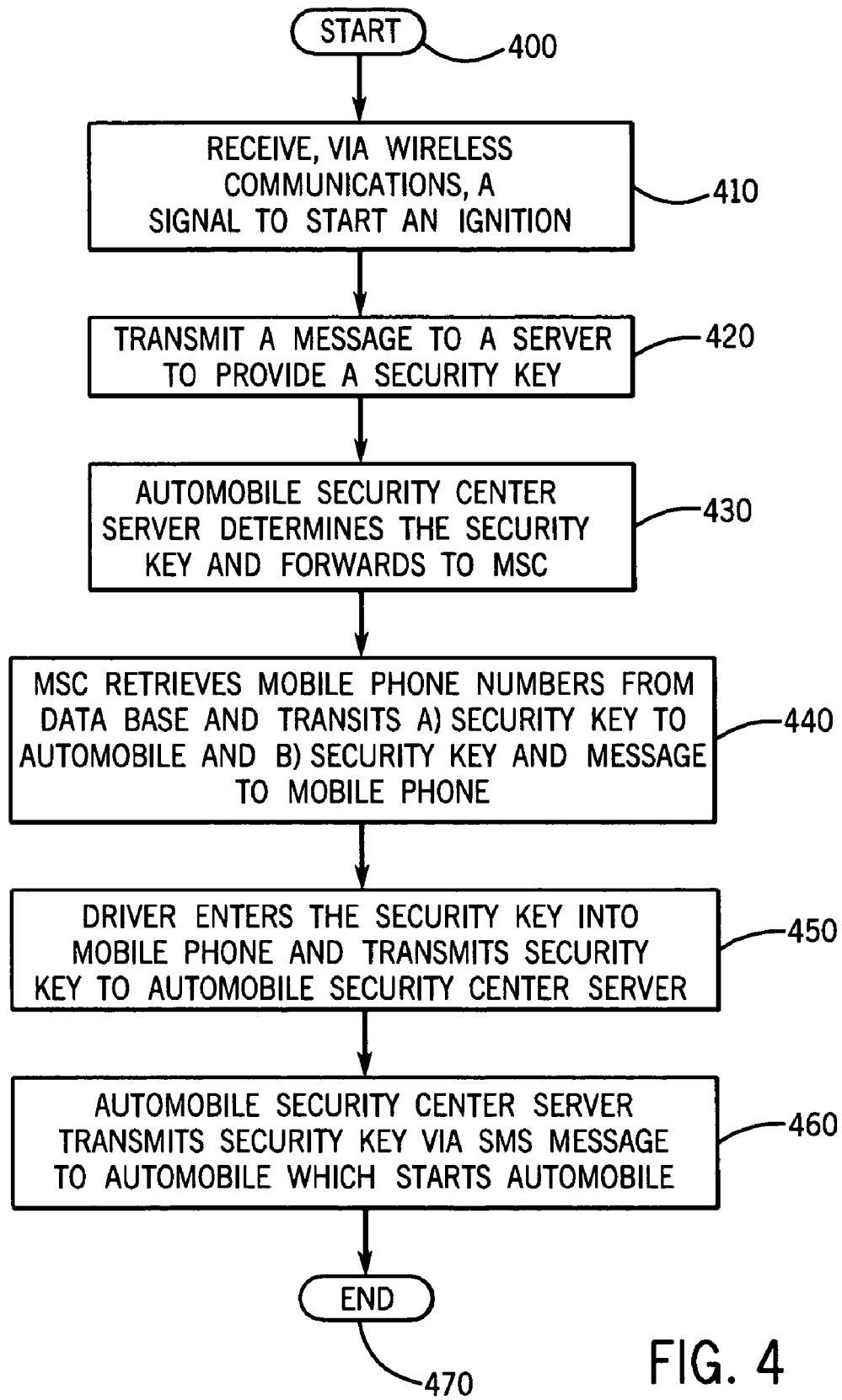
FIG. 4 shows another illustrative flow chart for a method of operating the present invention in accordance with the principles of the invention.

FIG. 4 shows another illustrative flow chart for a method of operating the present invention in accordance with the principles of the present invention. The process is entered in step 400.

In step 410 (FIG. 4), the driver of a vehicle, e.g., automobile 150 (FIG. 1) employs a fob associated with a remote keyless ignition system of the vehicle to start an ignition of the vehicle. Automobile 150 receives, via wireless communications, the signal from the fob when used by the driver of automobile 150. The activation of the ignition system of automobile 150 by the remote keyless ignition system is delayed until a security key has been received and verified.

In step 420 (FIG. 4), upon receipt of the signal, a built-in cellular phone system of automobile 150 (FIG. 1) automatically transmits a message via MSC 110 to a server, e.g., Automobile Security Center Server 160, to provide a security key to automobile 150 and to mobile phones, e.g., mobile phone 140, registered to the driver of automobile 150. The message may contain information identifying a) the driver of automobile 150 or b) automobile 150 itself, such as i) a license plate number; ii) a vehicle identification number (VIN); iii) a telephone number of the built-in cellular phone system; iv) a bar code; v) the year, make and model type of automobile 150; or other identifying information.

In step 430 (FIG. 4), Automobile Security Center Server 160 (FIG. 1) determines the security key and transmits a message with the security key and the identifier to MSC 110 instructing MSC 110 to a) forward the security key to automobile 150 and b) forward the security key and a message to one or more mobile phones of the driver or owner of automobile 150. Automobile Security Center server 160 may transmit the message with the security key and the identifier via a SMS message.

In step 440 (FIG. 4), MSC 110 (FIG. 1) uses the identifier to retrieve the telephone numbers of one or more mobile phones registered to the owner or driver of automobile 150 from data base 130. Upon obtaining the telephone numbers, MSC 110 transmits the security key to automobile 150 via base station 120. Also, MSC 110 provides the security key and a message to one or more mobile phones, e.g., mobile phone 140, registered to the driver of automobile 150 via a phone call, a text message or a SMS message. In providing the phone call, MSC 110 may utilize interactive voice response server 170 to announce via an automated voice that "An attempt has been made to start automobile 150 and the security key is 123".

In step 450 (FIG. 4), upon receiving the security key, the driver of automobile 150 (FIG. 1) enters the security key into mobile phone 140. Mobile phone 140 transmits the security key via a short message service (SMS) message to Automobile Security Center Server 160 (FIG. 1).

In step 460 (FIG. 4), upon receiving the SMS message from mobile phone 140 (FIG. 1), Automobile Security Center Server 160 transmits a second SMS message to automobile 150 to start the ignition of automobile 150.

The process is exited in step 470 (FIG. 4).

Figure 5:
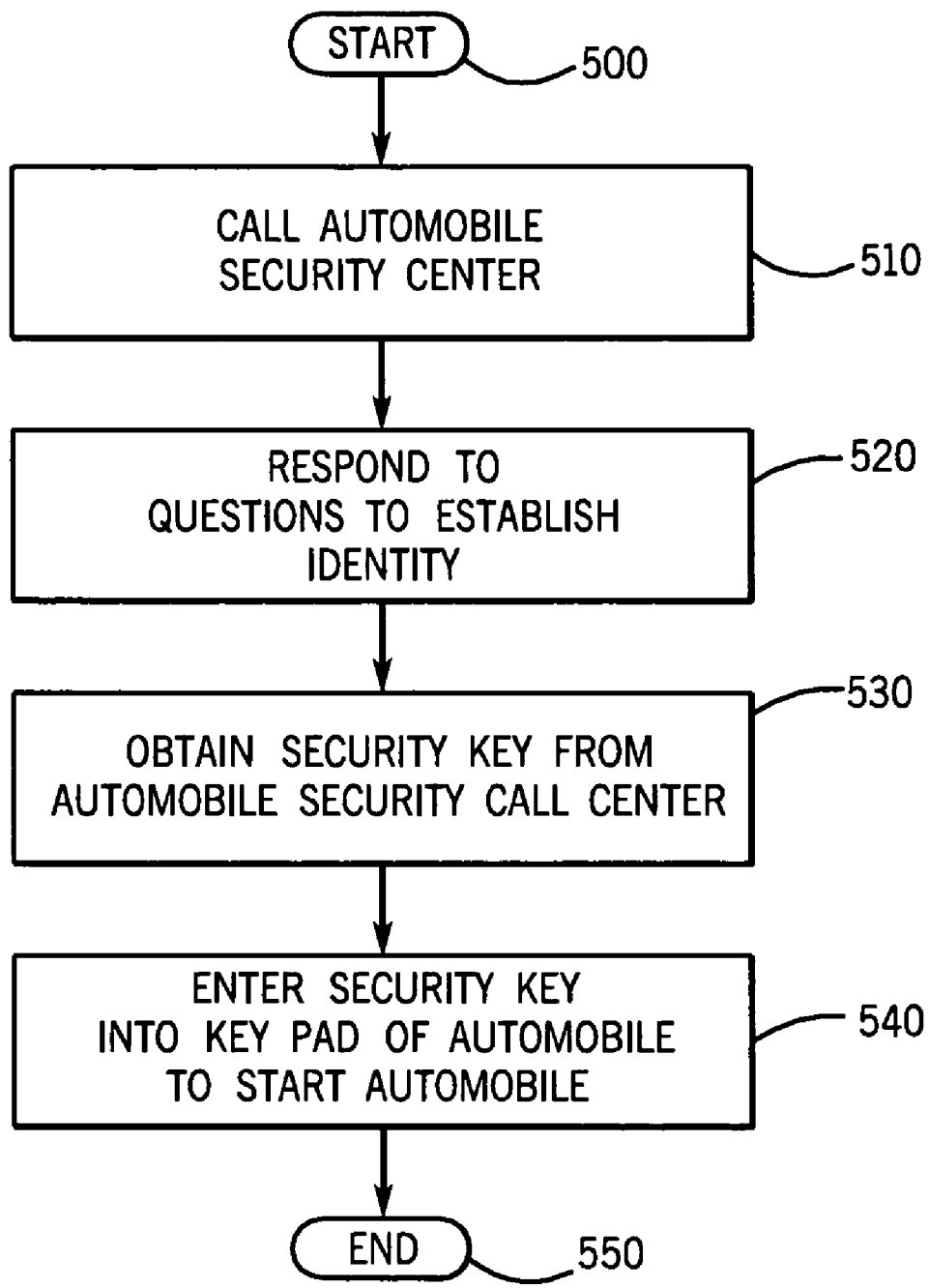
FIG. 5 shows yet another illustrative flow chart for a method of operating the present invention in accordance with the principles of the invention.

FIG. 5 shows yet another illustrative flow chart for a method of operating the present invention in accordance with the principles of the invention. The process is entered in step 500.

In step 510 (FIG. 5), the driver of a vehicle, e.g., automobile 150 (FIG. 2) calls a security call center, e.g., Automobile Security Center Call Center 280, via mobile phone 140 or any available mobile phone or a wire-line telephone.

In step 520 (FIG. 5), an employee of Automobile Security Center Call Center 280 (FIG. 2) asks the driver of automobile 150 a series of questions to establish the identity of the driver of automobile 150.

In step 530 (FIG. 5), upon establishing the identity of the driver of automobile 150 (FIG. 2), the employee of Automobile Security Center Call Center 280 may provide a security key verbally by telephone.

In step 540 (FIG. 5), the driver of automobile 150 (FIG. 2) may enter the security key into a keypad within automobile 150 to start automobile 150.

The process is exited in step 550 (FIG. 5).

In practice, wireless telecommunications system processes are implemented in computer software using high-performance processors and high-capacity storage elements such as hard disk subsystems. The computer program code that implements particular telecommunications system functions is stored on computer-readable media, such as the hard disk system, and executed by the processor.

The steps or operations described herein are intended as examples. There may be many variations to these steps or operations without departing from the spirit of the invention. For instance, the steps may be performed in a differing order, or steps may be added, deleted, or modified.

Those of ordinary skill in the art will recognize that the present invention may be used for vehicles other than automobiles. In an alternative embodiment of the invention, the present invention may provide increased security via use of wireless networks for remote keyless ignition of a boat. In another alternative embodiment of the invention, the present invention may provide increased security via use of wireless networks for remote keyless ignition of a motorcycle. In yet another embodiment of the invention, the present invention may provide increased security via use of wireless networks for remote keyless ignition of an airplane, a tractor, and a train.

The foregoing merely illustrates the embodiments of the invention. It will thus be appreciated that those skilled in the art will be able to devise various arrangements, which, although not explicitly described or shown herein, embody the principles of the invention, and are included within its spirit and scope.

What is claimed:

1. A method of providing security for a vehicle activated by a keyless ignition system, the method comprising the steps of:
   receiving, via wireless communications, a signal to start an ignition of the vehicle;
   transmitting, upon receipt of the signal, a Session Initiation Protocol (SIP) message to a server to provide a first security key to the vehicle and a second security key to one or more mobile phones registered to a driver of the vehicle, wherein the SIP message contains a vehicle identification number (VIN) which identifies the vehicle; and
   starting the ignition when the second security key received by the driver and inputted to the vehicle is identical to the first security key received by the vehicle.

2. The method of claim 1 wherein the vehicle is selected from the group consisting of a) an automobile, b) a boat, c) an airplane, d) a tractor, e) a motorcycle, and f) a train.

3. The method of claim 1 wherein the step of starting the ignition further comprises the steps of:
   receiving the first security key;
   receiving the second security key inputted by the driver;
   comparing the first security key to the second security key; and making a determination as to whether there exists at least one difference between the first security key and the second security key.

4. The method of claim 3 further comprising the step of producing an alert when it is determined that the at least one difference exists.

5. The method of claim 1 further comprising the step of starting the ignition upon receipt of a short message service (SMS) message from the server when the driver enters the second security key into at least one of the one or more mobile phones and transmits the second security key to the server.

6. The method of claim 1 wherein the SIP message contains the vehicle identification number or a license plate number which identifies the vehicle.

7. The method of claim 1 wherein the SIP message contains the vehicle identification number or a bar code which identifies the vehicle.

8. The method of claim 1 wherein the SIP message contains the vehicle identification number or a telephone number of a built-in cellular phone system of the vehicle.

9. An apparatus to provide security for a vehicle activated by a keyless ignition system, comprising:
   means for receiving, via wireless communications, a signal to start an ignition of the vehicle;
   means for transmitting, upon receipt of the signal, a Session Initiation Protocol (SIP) message to a server to provide a first security key to the vehicle and a second security key to one or more mobile phones registered to a driver of the vehicle, wherein the SIP message contains a vehicle identification number (VIN) which identifies the vehicle; and
   means for starting the ignition when the second security key received by the driver and inputted to the vehicle is identical to the first security key received by the vehicle.

10. The apparatus of claim 9 wherein the vehicle is selected from the group consisting of a) an automobile, b) a boat, c) an airplane, d) a tractor, e) a motorcycle, and f) a train.

11. The apparatus of claim 9 wherein the means for starting the ignition further comprises:
   means for receiving the first security key;
   means for receiving the second security key inputted by the driver;
   means for comparing the first security key to the second security key; and
   means for making a determination as to whether there exists at least one difference between the first security key and the second security key.

12. The apparatus of claim 11 further comprising means for producing an alert when it is determined that the at least one difference exists.

13. The apparatus of claim 11 wherein the means for receiving the second security key inputted by the driver comprises a key pad.

14. The apparatus of claim 11 wherein the means for comparing and the means for making a determination comprises a processor performing a matching process.

15. An apparatus operable to a) transmit, upon receipt of a signal to start an ignition of a vehicle, a Session Initiation Protocol (SIP) message to a server to provide a first security key to the vehicle and a second security key to mobile phones registered to a driver of the vehicle, wherein the SIP message contains a vehicle identification number (VIN) which identifies the vehicle, b) receive, in response to the message, the first security key, c) compare the first security key to a second security key received by the driver and inputted in a key pad in the vehicle, d) make a determination as to whether there exists at least one difference between the first security key and the second security key, and e) start the ignition if the first security key and the second security key are identical.

16. The apparatus of claim 15 wherein the apparatus produces an alert when the at least one difference exists between the first security key and the second security key.

17. The apparatus of claim 15 wherein the vehicle is selected from the group consisting of a) an automobile, b) a boat, c) an airplane, d) a tractor, e) a motorcycle, and f) a train.

18. A method, comprising the steps of:
   receiving, via wireless communications, a signal to start an ignition of a vehicle;
   delaying activation of the ignition until a security key has been received and verified;
   transmitting, upon receipt of the signal, a Session Initiation Protocol (SIP) message to a server to provide the security key to the vehicle and to one or more mobile phones registered to a driver of the vehicle, wherein the SIP message contains a vehicle identification number (VIN) which identifies the vehicle;
   receiving, via the server, a first security key;
   receiving, via the driver of the vehicle, a second security key;
   comparing the first security key to the second security key;
   making a determination as to whether there exists at least one difference between the first security key and the second security key; and
   starting the ignition when the first security key and the second security key are identical.

19. A network, comprising:
   a server operable to determine a security key upon receipt of a Session Initiation Protocol (SIP) message that contains an identifier, and to transmit the security key and the identifier to at least one mobile switching center (MSC), wherein the SIP message contains a vehicle identification number (VIN) which identifies a vehicle; and
   a MSC coupled to the server, the MSC being operable to a) receive the security key and the identifier, b) retrieve, with the identifier, stored telephone numbers of one or more mobile phones registered to a driver of the vehicle, and c) transmit the security key to start an ignition of the vehicle.

20. The network of claim 19 wherein the identifier is at least one of the group consisting of: i) a license plate number, ii) the vehicle identification number (VIN), iii) year, make and model information, iv) a telephone number of a built-in cellular phone system of the vehicle, and v) a bar code.

21. The network of claim 19 wherein the server is operable to transmit the security key to the at least one MSC via a short message service (SMS) message.

22. The network of claim 19 wherein the MSC is operable to transmit the security key and a message to the one or more mobile phones registered to the driver.

23. The network of claim 22 wherein the MSC is operable to transmit the message to the one or more mobile phones registered to the driver via a phone call, a text message or a SMS message.

24. The network of claim 19 further comprising a base station connected to the MSC, the base station being operable to transmit a) calls from the one or more mobile phones to the MSC and b) the security key and a message from the MSC to the one or more mobile phones.

* * * * *